June 13, 1950 J. C. TELLIER ET AL 2,511,086
SUPERREGENERATIVE RECEIVER
Filed April 6, 1946
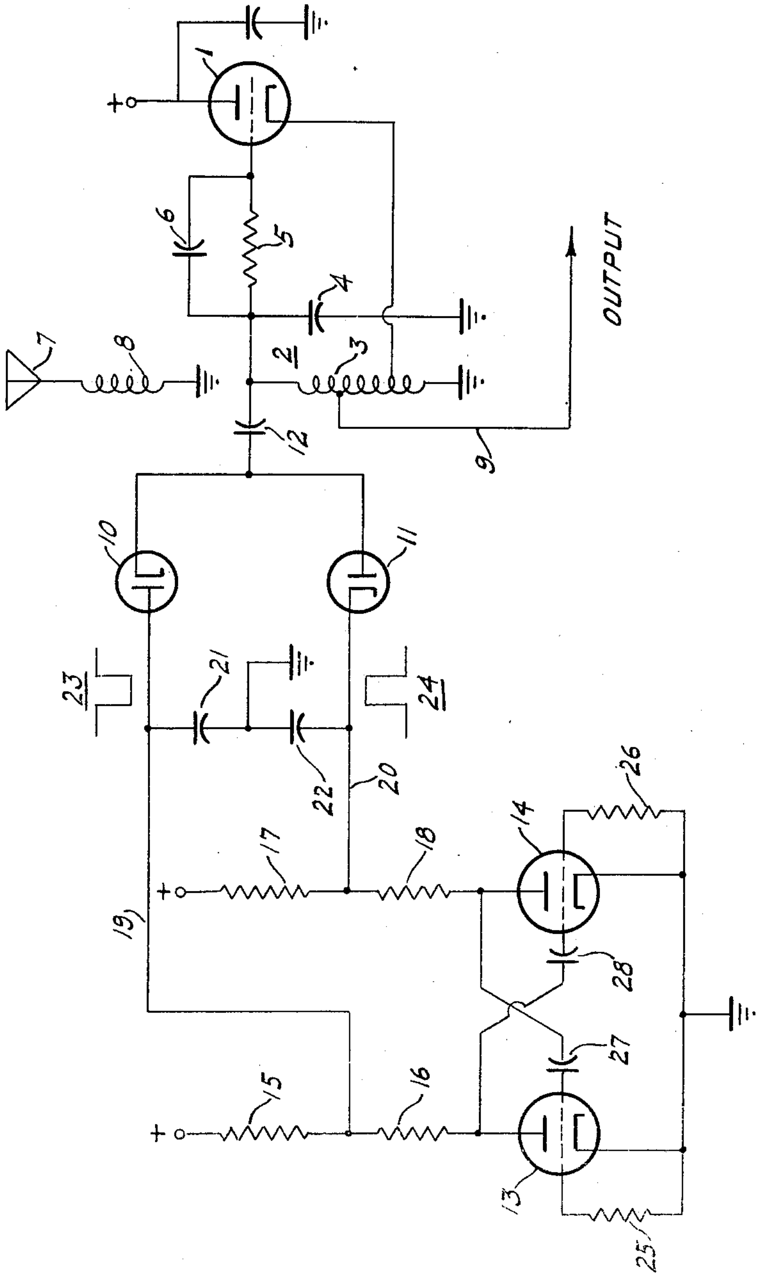
INVENTORS
JOSEPH C. TELLIER and
HARRY H. WILSON JR.
BY
AGENT Patented June 13, 1950 2,511,086

UNITED STATES PATENT OFFICE 2,511,086

SUPERREGENERATIVE RECEIVER

Joseph C. Tellier, Penn Wynne, and Harry H. Wilson, Jr., Philadelphia, Pa., assignors, by mesne assignments, to Philco Corporation, Philadelphia, Pa., a corporation of Pennsylvania Application April 6, 1946, Serial No. 660,036

1 Claim. (Cl. 250—20)

This invention relates to novel circuit arrangements utilizing a multivibrator oscillator to supply inverse signals of substantially rectangular waveform and of substantially equal amplitude to control the quenching and unquenching of a super-regenerative receiver without inducing appreciable shock excitation of the oscillator tank circuit. By shock excitation is meant that harmonics of the quench signal, in the neighborhood of the frequency to which the tank circuit is tuned, are introduced into the tank circuit and cause oscillations to build up independently of the desired oscillations resulting from the presence of a received signal. This tends greatly to reduce the signal-to-noise ratio of the receiver and is most undesirable.

In copending application of William E. Bradley, Serial Number 660,037, filed April 6, 1946 is described and claimed a circuit arrangement employing a pair of unilateral conducting devices adapted to be supplied with such a push-pull quenching signal so as alternately and periodically to damp and undamp the tank circuit of a superregenerative receiver. The present invention provides a circuit arrangement which, cooperating with that of the Bradley invention, operates as a whole to develop the desired push-pull quenching signal and to apply it to the tank circuit of a superregenerative receiver without inducing appreciable shock excitation. It eliminates the need for a phase inverter which, because of stringent specifications to be met with respect to frequency and phase characteristics, is difficult satisfactorily to design.

Features and advantages of the invention in addition to those above referred to will become apparent from a consideration of the following specification and the single figure illustrating an embodiment of the invention applied to a superregenerative receiver.

In the embodiment shown, the superregenerative receiver comprises a triode 1 and a resonant tank circuit 2 including inductor 3 and condenser 4. Tank circuit 2 may be tuned to any frequency suitable for the superregenerative oscillation. A portion of inductor 3 is made common to both grid and plate circuits of triode 1 in order to provide the necessary mutual coupling required for oscillation. The grid of triode 1 may be appropriately biased through the action of grid leak 5 and condenser 6. Received signals intercepted by antenna 7 are supplied to tank circuit 2 through the medium of mutual coupling between inductors 3 and 8. Signal output from the tank circuit is derived through a connection 9 to a tap on inductor 3.

The damping circuit for tank circuit 2 is essentially the same as that described in the aforementioned copending application. It comprises diodes 10 and 11 the cathode and plate of which, respectively, are coupled to the high potential side of the tank circuit through blocking condenser 12. The quenching signal generator comprises triodes 13 and 14 associated with condensers 27 and 28 and resistors 25 and 26 to form a multivibrator oscillator oscillating at a frequency which is preferably lower than that of the superregenerative oscillator. Such an oscillator, as is well known in the art, is adapted to generate signals of substantially rectangular waveform. Also forming a part of the multivibrator oscillator circuit are resistors 15 and 16 connected in the plate circuit of triode 13, and resistors 17 and 18 connected in the plate circuit of triode 14. From the junction of resistors 15 and 16 and the junction of resistors 17 and 18, are derived mutually inverse control signals of substantially equal amplitude as represented at 23 and 24 which are supplied through connections 19 and 20 to the plate and cathode of diodes 10 and 11, respectively. During the occurrence of a negative pulse on the plate of diode 10 and a positive pulse on the cathode of diode 11, both tubes will be cut off and no damping will be induced in tank circuit 2, so that oscillations will build up therein. However, in the intervals between unquenching pulses, when the plate of diode 10 is positive and the cathode of diode 26 is negative, both diodes will be rendered conductive and currents at the oscillator frequency will flow in both of them.

Because of the fact that equal and opposite quench control signals are applied respectively to the plate of diode 10 and the cathode of diode 11, the high potential side of tank circuits will experience no alternating potential variation corresponding to the quench control waveform, and hence tank circuit 2 will be substantially free from shock excitation.

The plate of diode 10 and the cathode of diode 11 are connected to ground through condensers 21 and 22, respectively. The values of these condensers should be made sufficiently large to permit them to by-pass currents at the oscillator frequency. On the other hand, they should not be so large as to prevent the application of quenching signals of appreciable magnitude to diodes 10 and 11.

Although, in the embodiment shown, the mutually inverse quench control signals are derived from the plate circuits of triodes 13 and 14, it will be apparent that similarly inverse signals are present in the grid and in the cathode circuits, and that the quench control signals can, if desired, be derived from these circuits in an obvious manner. Thus, if a low impedance output were desired, the mutually inverse signals might be derived from resistors in the cathodes of both tubes.

For example only, the values of certain of the components used in the embodiment just described are given. For the case in which the superregenerator oscillates at 60 megacycles per second and is unquenched at the rate of 80 kilocycles per second, diodes 13 and 14 may be the two sections of a type 6SN7 double triode, diodes 10 and 11 may be the two sections of a type 6H6 double diode, and the values of other components may be as follows:

| | | |
|---|---|---|
| Condensers 27 and 28 | μμ farads | 150 |
| Resistors 25 and 26 | ohms | 47,000 |
| Resistors 16 and 18 | ohms | 2,700 |
| Resistors 15 and 17 | ohms | 270 |
| Condensers 21 and 22 | μμ farads | 25 |
| Condenser 12 | μμ farads | 200 |

Certain variations in the circuit arrangement, not here shown but such as will occur to those skilled in the art upon reading this specification, are regarded as being within the scope of our invention.

We claim:

In a superregenerative receiver, a vacuum tube and a resonant tank circuit cooperating to form an oscillator adapted to oscillate at a relatively high frequency, means for applying to said oscillator a signal to be amplified therein, a multivibrator oscillator adapted to generate recurrent signals of substantially rectangular waveform at a relatively lower frequency, said oscillator comprising a pair of vacuum tubes, each having at least triode elements, an impedance connected in the plate circuit of said tubes and means for rendering said tubes alternately conductive, first and second diodes, a common connection from the plate of said first diode and the cathode of said second diode to a point on said tank circuit, separate connections from the cathode of said first diode and from the plate of said second diode to a different point on said tank circuit, all of said connections being of relatively low impedance for currents at the frequencies of said high frequency oscillations and cooperating to provide a pair of closed circuits, each presenting relatively low impedance to the flow of currents therein at the frequencies of said high frequency oscillations and each including serially one of said diodes and a portion of said tank circuit between said two points on said tank circuit, separate connections from the impedance in the plate circuit of one of said vacuum tubes to the cathode of said first diode and from the impedance in the plate circuit of the other of said vacuum tubes to the plate of said second diode for applying inverse signals of substantially equal amplitudes from said multivibrator oscillator to said diodes respectively to render said diodes simultaneously alternately conductive and non-conductive, whereby to control the damping of said tank circuit, and means for deriving output from said tank circuit.

JOSEPH C. TELLIER.
HARRY H. WILSON, Jr.

REFERENCES CITED

The following references are of record in the file of this patent:

UNITED STATES PATENTS

| Number | Name | Date |
|---|---|---|
| 2,129,820 | Chaffee | Sept. 13, 1938 |
| 2,154,492 | Clough | Apr. 18, 1939 |
| 2,178,772 | Bahring | Nov. 7, 1939 |
| 2,230,108 | Gerhard | Jan. 28, 1941 |
| 2,407,394 | Birr | Sept. 10, 1946 |